United States Patent [19]

Baumann

[11] Patent Number: 4,469,305
[45] Date of Patent: Sep. 4, 1984

[54] LOW TORQUE BUTTERFLY VALVE DISC

[76] Inventor: Hans D. Baumann, 32 Pine St., Rye, N.H. 03870

[21] Appl. No.: 491,808

[22] Filed: May 5, 1983

Related U.S. Application Data

[63] Continuation of Ser. No. 313,830, Oct. 22, 1981, abandoned.

[51] Int. Cl.³ .............................................. F16K 1/22
[52] U.S. Cl. .................................................. 251/305
[58] Field of Search ....................... 251/305, 306, 175

[56] References Cited

U.S. PATENT DOCUMENTS

| | | | |
|---|---|---|---|
| 2,278,421 | 4/1942 | Brown | 251/305 |
| 2,361,006 | 12/1941 | Brown | 251/305 |
| 2,816,729 | 12/1957 | Jensen | 251/175 |
| 3,269,414 | 8/1966 | Mayo | 251/306 |
| 3,290,001 | 12/1966 | Taylor | 251/175 |
| 3,680,833 | 8/1972 | McNeely, Jr. | 251/305 |
| 3,960,177 | 6/1976 | Baumann | 251/305 |
| 4,335,738 | 6/1982 | Nassir | 251/305 |

Primary Examiner—Martin P. Schwadron
Assistant Examiner—Sheri Novack

[57] ABSTRACT

A butterfly valve disc of generally oval shape, tiltingly arranged so that the outer periphery forms a perfect circle intersecting with the inner bore of a butterfly valve, and where two semi-circular wall portions forming said discs have angularly offset planary axes to substantially reduce hydrodynamic torque.

5 Claims, 7 Drawing Figures

LOW TORQUE BUTTERFLY VALVE DISC

This is a further improvement and modification upon my invention "Low Torque and Low Noise Butterfly Valve Disc" patented under U.S. Pat. No. 3,960,177 and a continuation of my U.S. patent application Ser. No. 06/313,830 filed on Oct. 22, 1981, now abandoned.

BRIEF SUMMARY AND BACKGROUND OF THE INVENTION

Butterfly valves used for automatic control reduce pressure particularly at low flow, i.e., low disc openings. Such pressure reduction can only be accomplished by acceleration and subsequent deceleration of the passing medium, where the maximum velocity is a square root function of the pressure drop. Unfortunately, such high velocities along the leading edges of butterfly valves produce undesirable side effects. Such side effects are cavitation with liquid media, aerodynamic throttling noise with gases, and a high dynamic torque with either medium. Such dynamic torque, increasing rapidly towards the fully open position and reaching a peak near 70° disc opening (see curve A in FIG. 4), greatly interferes with the stable valve operation particularly when pneumatic actuators are employed. This torque is a function of the suction effect (much like the "lift" of an airplane wing) produced by high velocity on the upper surface of that portion of the disc pointing in the downstream direction.

Past butterfly discs of improved designs have tried to overcome this dynamic torque problem, notably among them a disc whose terminating downstream periphery has the shape of a fishtail. Another design employs semi-circular cavities on opposing sides of a circular disc. While those designs show improvements in reduction of dynamic torque, neither of them meets the additional objectives of my invention, which are:

a. reduce hydrodynamic torque;
b. provide tight shut-off;
c. create a better control characteristic.

My invention produces substantially less dynamic torque than either of the present state of the art butterfly discs by providing two tiltingly offset semi-circular wall portions forming the basic disc.

With the vane sitting at a typical seat angle of between 15°–20° from an axis perpendicular to the cylindrical butterfly valve bore, I have the upper semi-circular disc portion approximately perpendicular to said bore and the lower semi-circular wall portion tilted at an approximate angle of 30° in respect to the upper half.

As can be seen from FIG. 4 of my attached drawing, dynamic torque peaks at around 70° of the angular displacement from the vertical axis for a flat vane. Above this angle, the torque is drastically reduced and reaches a negative value beyond 90°. Two angularly offset vane halves accomplish that the upper, perpendicular half may experience a positive torque factor, being retarded in angular displacement from the lower half, while the latter at the same time crosses into a negative torque factor. The net result of the two divergent torque effects is a much lower net torque characteristic as shown in FIG. 4 curve C of my attached drawings.

My invention also provides means to combine tight shut-off with the other aforementioned advantages, in that its configuration (contrary to other "low torque" designs) allows an angular attachment, usually between 15°–20° to the vertical valve axis of the outer disc periphery to provide intimate contact and thereby greatly reduced valve leakage. The angle of contact is chosen depending on the type of material employed, that is, the tangent of the angle has to exceed the coefficient of static friction to avoid self-locking.

A further object of my invention is the ability to create a tight shut-off valve for so-called rubber lined butterfly valves. These valves consist usually of tubular steel or cast iron housings having either vulcanized or molded elastomeric inserts at their inner bores. It is customary to use cylindrical butterfly valve vanes for on-off purposes. Sealing is accomplished by squeezing an oversized vane into the rubber lined butterfly valve bore. This interference with, and displacement of, portions of the elastomeric insert provides the desired shut-off. However, one less desired by-product of this procedure is high static torque, also called "breakaway" torque. The other is wear of the liner material. While this breakaway torque is not considered too detrimental for hand operated valves, it nevertheless becomes highly objectionable for pneumatic operated modulating control valves. Any sudden forces changes, such as previously described, tend to cause dynamic instability and are very detrimental to the desired control function of such a valve.

My invention overcomes these difficulties by providing an angle seated vane wherein the elastomeric insert can be compressed with a relatively gentle force of the tilting vane periphery which avoids the squeezing action of a circular vane being pushed essentially in a direction parallel to the liner axis. As a result, the previously described breakaway torque is avoided and the operator torque required to provide shut-off cut in half.

Yet another objective of my invention is that the angular offset vane allows the hub portion to be subdivided into two relatively short sections which eliminates the very expensive task of drilling a shaft bore through the complete diameter of the vane where the typical length of such bores is 12 times its diameter and requires the utilization of very special tools such as gun drills. My invention allows the use of conventional tooling since the bore distance can be kept to approximately two diameters.

These and other advantages and objectives will be more apparent when viewed in light of the following detailed description and drawings.

DETAILED DESCRIPTION OF THE INVENTION

Figure 1:
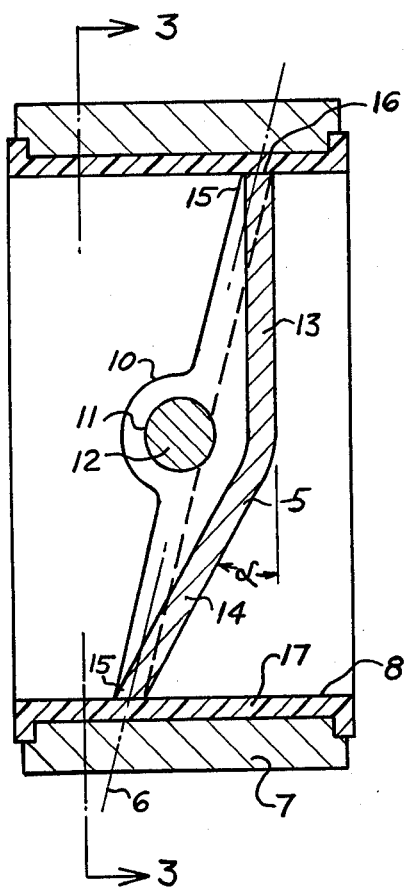
FIG. 1 is a vertical, sectional view of a preferred embodiment of my invention when installed in a butterfly valve housing when turned into the closed valve position.
Figure 5:
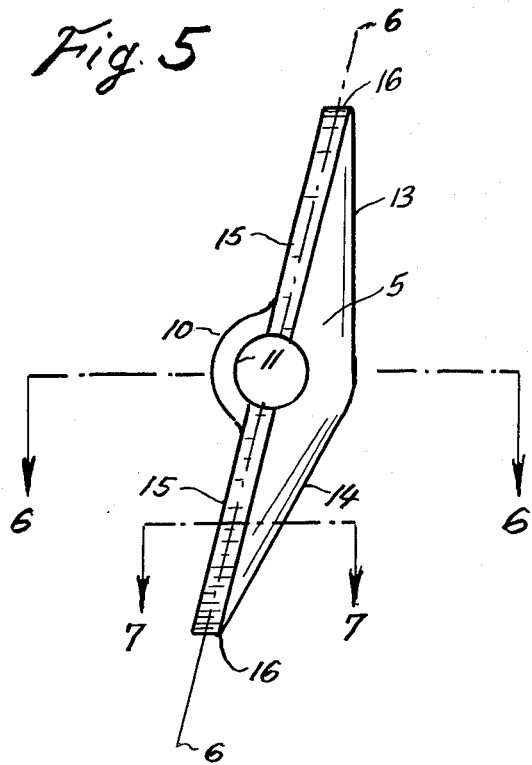
FIG. 5 is an external view of the butterfly valve disc shown in FIG. 1 without the valve housing.

Referring to FIG. 1, my invented butterfly valve disc consists in its preferred embodiment of a disc 5, which is tiltingly installed in a conventional state of the art butterfly valve housing 7 (not part of my invention), having a circular bore 8 thus giving the discs a generally oval shaped surface area. A flat machined surface 16 forming the terminating outer periphery of disc 5 is in close contact with the inner wall of bore 8, whenever the valve is in the "closed" position, as indicated in FIG. 1, thus providing a sealing interface for the fluid to be controlled. The machined surface 16 forms a straight line of contact with bore 8 as can be seen in FIG. 5 whose axis 6—6 is tilted typically 15°–20° to the perpendicular axis of bore 8. Hub portions 10 extend along the center of disc 5 and close to bore 8, each containing within a central circular hole 11 occupied by a valve shaft 12, which supports the tiltingly arranged disc 5. The latter is composed of two partially flat and semi-circular wall portions, the upper one being labeled 13 and the lower one being labeled 14. The upper semi-circular portion 13 is arranged to have a planary axis that is essentially vertical when the vane is closed (see FIG. 1). The lower semi-circular wall portion 14 is tilted at an angle α of typically 30° to 35° in respect to wall portion 13. Both wall portions 13 and 14 are interjoined at the center and curved at the outer periphery to form a common rim 15 which forms a flat sealing surface 16 to sealingly compress an elastomeric liner 17 which may be part of butterfly valve body 7.

Figure 2:
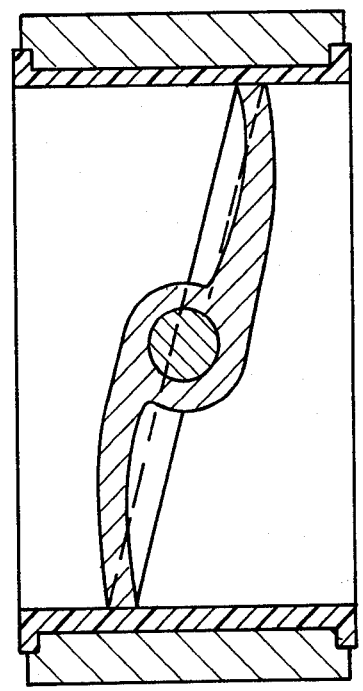
FIG. 2 is a vertical sectional view of a present state of the art low torque vane.
Figure 3:
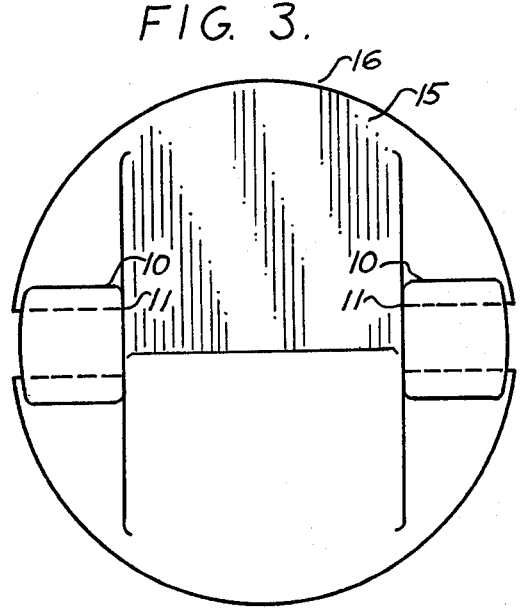
FIG. 3 is a vertical planary view taken along the lines 3—3, as indicated in FIG. 1, with the butterfly valve housing removed for clarity.

FIG. 2 shows a typical state of the art low torque butterfly valve vane, where two semi-circular vane halves offer torque reducing concave shapes generally along the shape of the letter "S".

Figure 4:
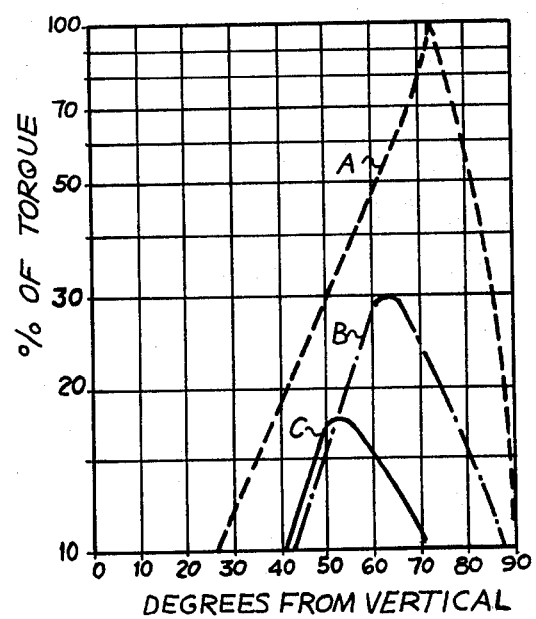
FIG. 4 is a graphic comparison of the dynamic torque characteristic of my invention compared to that of conventional state of the art butterfly discs.

FIG. 4 shows test results of dynamic torque measured as a function of angular displacement of typical vane configurations from an axis located perpendicular to the butterfly valve bore. The curve labeled "A" depicts the conventional, generally flat and symmetrical butterfly valve disc whose torque values peak around 70°. An S-shaped vane configuration as shown in FIG. 2 was able to reduce the dynamic torque to about 30% of that of a conventional vane. However, by providing the angular offset of my invention, further substantial improvement was measured to reduce the peak value to about 17% as shown with curve "C".

Figure 6:
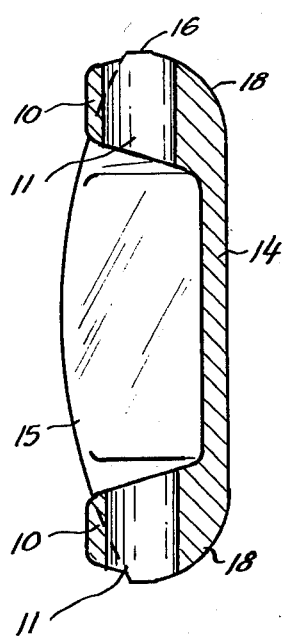
FIG. 6 is a horizontal, sectional view taken along the lines 6—6 of the disc shown in FIG. 5.
Figure 7:
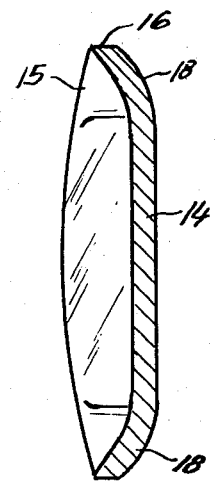
FIG. 7 is a further horizontal, sectional view taken along the lines 7—7 in FIG. 5.

FIG. 5 shows an external view of disc 5 removed from housing 7 for adding clarity. This exterior view shows the outer extremity of semi-circular wall portions 13 and 14 joining at the center of disc 5 at a location displaced from bore 11 and terminating at their respective outer peripheries in the common rim 15. A curvature 18, as indicated in FIGS. 6 and 7, is provided to make the transition from the predominately flat surfaces of each of the semi-circular vane halves 13 and 14 towards the common rim 15. This curvature 18 digresses towards the upper and lower terminating ends of disc 5. As shown in FIGS. 6 and 7, the amount of curvature needed to provide this transition in geometry is minor and does not detract materially from the torque reducing effect of the predominately flat and angularly offset to each other geometries of vane halves 13 and 14.

Having shown my invention as a preferred configuration, should not exclude the possibility to make numerous modifications, such as to attach lifting arms for the connection of valve stems to disc 5 and inserting bearings inside a bore 11. Furthermore, rim 13 could be circularly extended around shaft bore 11 at each outer extremity of hubs 10 to allow a sealing engagement against a rubber liner 17 and to prevent leakage past bore 11 when the vane 5 is in the closed position as shown in FIG. 1. These and other modifications can be made without departing from the spirit of my invention or from the scope of the attached claims.

I claim:

1. A low torque butterfly disc comprising:
   a. an oval shaped disc whose planary axis is angularly offset from the perpendicular axis of the cylindrical bore of a butterfly valve and having an outer periphery forming a rim which is fitting closely within said cylindrical bore and forming a straight line of contact with said bore when in the closed valve position, said disc being further composed of one upper and one lower centrally connected nearly semicircular wall section, each having partially flattened center portions whose planary axes are angularly offset in respect to each other, the outer periphery of both sections interjoining to form said rim;
   b. at least one perpendicular hub section located on a common axis central to said cylindrical bore and straddling the shortest width of said oval shaped disc and containing within a bore to receive a supporting valve shaft.

2. A low torque butterfly valve disc as described in claim 1, wherein the planary axis of the flattened upper semi-circular wall portion is generally aligned with the perpendicular axis of the cylindrical bore of said butterfly valve when in the closed position.

3. A low torque butterfly valve disc as described in claim 1, wherein each of said semi-circular wall sections is displaced from the central section of said oval shaped disc to avoid interference with said supporting valve shaft.

4. A low torque butterfly valve disc as described in claim 1, wherein the angular offset of the planary axis of said oval shaped disc from the perpendicular axis of the cylindrical butterfly valve bore is between 13° and 20° when in the closed position.

5. A low torque butterfly valve disc as described in claim 1, where in the planary axis of the flattened lower semi-circular wall portion is generally tilted at an angle of 28° to 38° from the perpendicular axis of the straight cylindrical bore of said butterfly valve when in the closed position.

* * * * *